United States Patent
Terry et al.

(10) Patent No.: US 11,845,569 B2
(45) Date of Patent: Dec. 19, 2023

(54) EDDIE-BOLT INSPECTION TOOL

(71) Applicant: Lockheed Martin Corporation, Bethesda, MD (US)

(72) Inventors: Alyssa Marie Terry, Smyrna, GA (US); Steven Wade Miletto, Smyrna, GA (US); Alondra Renee Guevara, Fort Worth, TX (US); Jack P. Golson, Atlanta, GA (US); Dustin Loden, Powder Springs, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 742 days.

(21) Appl. No.: 17/025,579

(22) Filed: Sep. 18, 2020

(65) Prior Publication Data
US 2022/0089296 A1 Mar. 24, 2022

(51) Int. Cl.
| | |
|---|---|
| *G01B 5/00* | (2006.01) |
| *B64F 5/60* | (2017.01) |
| *B64F 5/40* | (2017.01) |
| *F21Y 115/10* | (2016.01) |

(52) U.S. Cl.
CPC ............ *B64F 5/60* (2017.01); *B64F 5/40* (2017.01); *G01B 5/0025* (2013.01); *G01B 5/0032* (2013.01); *F21Y 2115/10* (2016.08)

(58) Field of Classification Search
CPC . B64F 5/60; B64F 5/40; G01B 5/0025; G01B 5/0032; G01B 3/34; G01B 5/061; G01B 5/02; G01B 5/08; F21Y 2115/10; F16B 39/00
See application file for complete search history.

(56) References Cited

U.S. PATENT DOCUMENTS

| | | | |
|---|---|---|---|
| 4,777,610 A | 10/1988 | Barwick et al. | |
| 5,189,808 A | 3/1993 | Evans et al. | |
| 6,626,603 B2* | 9/2003 | Gudaitis | F16B 5/0241 403/30 |
| 6,668,441 B1* | 12/2003 | Gudaitis | F16B 5/0241 403/30 |
| 6,978,552 B1 | 12/2005 | Sluder | |
| 7,080,461 B2* | 7/2006 | Jensen | G01B 3/22 33/645 |

(Continued)

FOREIGN PATENT DOCUMENTS

| | | |
|---|---|---|
| CN | 209764000 | 11/2019 |
| GB | 2504963 | 2/2014 |

OTHER PUBLICATIONS

Extended European Patent Search, Communication from EP Patent Office, dated Feb. 7, 2022.

*Primary Examiner* — Yaritza Guadalupe-McCall
(74) *Attorney, Agent, or Firm* — Baker Botts L.L.P.

(57) ABSTRACT

In one embodiment, systems and methods include using an eddie-bolt inspection tool to measure one or more eddie-bolts. An eddie-bolt inspection tool comprises a body; a valve; a light-emitting diode (LED); a battery; a first position switch; a second position switch; a cap; a nose piece; and a cover; wherein the cap is disposed on top of the body, wherein the body is disposed on top of the nose piece, where the nose piece is at least partially disposed within the body, wherein the cover is disposed around and on at least a portion of the body, wherein the body comprises: a first side; a second side; a third side; a fourth side; and an opening.

20 Claims, 4 Drawing Sheets

(56) References Cited

U.S. PATENT DOCUMENTS

| | | | |
|---|---|---|---|
| 7,100,299 B2* | 9/2006 | Jensen | G01B 3/22 33/645 |
| 7,152,307 B2* | 12/2006 | Swanberg | B23Q 17/20 29/709 |
| 7,412,780 B2* | 8/2008 | Holder | F01D 5/005 33/562 |
| 9,057,593 B1* | 6/2015 | Wong | G01B 5/061 |
| 9,797,856 B2 | 10/2017 | Smith et al. | |
| 11,053,026 B2* | 7/2021 | Martres | B64F 5/60 |
| 2005/0177990 A1* | 8/2005 | Swanberg | G01B 5/18 703/1 |
| 2022/0089296 A1* | 3/2022 | Terry | B64F 5/60 |

* cited by examiner

EDDIE-BOLT INSPECTION TOOL

TECHNICAL FIELD

This disclosure generally relates to inspection devices, and more specifically, to an inspection tool for measuring the height and swage of a bolt that has been installed.

BACKGROUND

Eddie-bolts are high-performance fasteners used in the assembly of aircraft, such as the F-35. To ensure that the eddie-bolt has been installed correctly, a mechanic uses two separate measuring devices to ensure that the bolt is both the correct height and has been swaged correctly. These two devices are used to visually ensure that the bolt has been installed correctly and can be difficult to determine in hard to reach areas. It can also cause bending or straining for the operator to ensure that they are accurately reading the measuring device. Due to the possible subjectivity of the current measuring device, an inspector has to inspect each bolt again after the mechanic has finished the initial inspection. By the time inspection is complete, each bolt has been checked twice with two different tools, leading to four checks for every eddie-bolt installed.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 9, where like numbers are used to indicate like and corresponding parts.

Described herein are various systems, tools, and methods that provide for both the height and the swage of an eddie-bolt to be checked at the same time and to give an immediate visual signal if the bolt has been installed correctly or not. The eddie-bolt inspection device may remove operator subjectivity in measuring the bolt height and decrease the ergonomic risk by removing the need for operators to bend over to read the height measurements. The eddie-bolt inspection device may further allow for the operator to use a singular tool for both measurements and does not require an inspector repeat the process of measuring, thereby reducing the number of inspections for each bolt from four to one.

Figure 1:
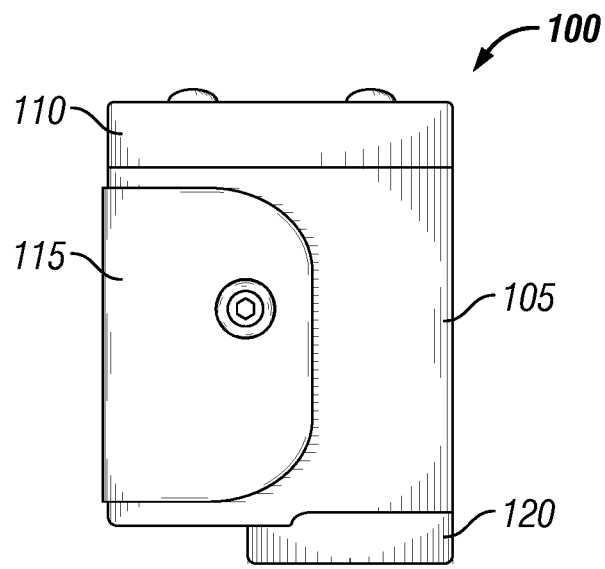
FIG. 1 illustrates an example eddie-bolt inspection tool, according to certain embodiments.

FIG. 1 illustrates an isometric view of an eddie-bolt inspection tool 100. The eddie-bolt inspection tool 100 may be configured to measure and/or verify the height and swage of one or more eddie-bolts used in the assembly of an aircraft. In one or more embodiments, the swage may be the post-installation diameter of the eddie-bolt. The eddie-bolt inspection tool 100 may be further configured to visually indicate that the height and swage of each of the one or more eddie-bolts are correct and/or within an allowable tolerance. In embodiments, the eddie-bolt inspection tool 100 may be any suitable size, height, shape, and combinations thereof. In embodiments, the eddie-bolt inspection tool 100 may comprise a generally rectangular cross-sectional shape. The eddie-bolt inspection tool 100 may comprise any suitable materials. Without limitations, the suitable materials may be metals, nonmetals, polymers, composites, and any combinations thereof. In embodiments, the eddie-bolt inspection tool 100 may comprise a body 105, a cap 110, a cover 115, and a nose piece 120.

As illustrated, the cap 110 may be disposed on top of the body 105. In embodiments, the body 105 may be disposed on top of the nose piece, where the nose piece 120 may be at least partially disposed within the body 105. In embodiments, the cover 115 may be disposed around and on at least a portion of the body 105 so as to enclose the interior of the body 105. In these embodiments, the cover 115 may be disposed in-line with the thickness of the sides of the body 105.

Figure 2:
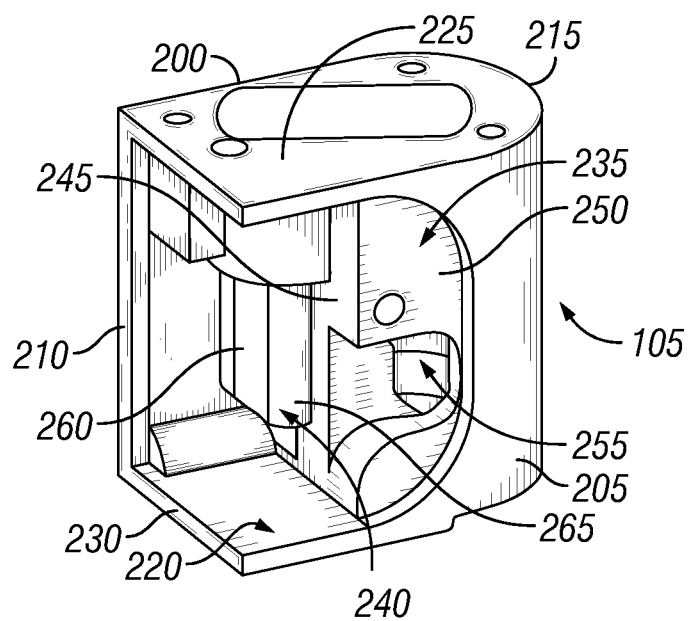
FIG. 2 illustrates an example body of the eddie-bolt inspection tool in FIG. 1, according to certain embodiments.

FIG. 2 illustrates an embodiment of the body 105. In one or more embodiments, the body 105 may be configured to contain one or more of the components of the eddie-bolt inspection tool 100 (referring to FIG. 1) at least partially within an interior of the body 105. In embodiments, the body 105 may be any suitable size, height, shape, and combinations thereof. The body 105 may comprise any suitable materials. Without limitations, the suitable materials may be metals, nonmetals, polymers, composites, and any combinations thereof. In one or more embodiments, the body 105 may comprise and/or be defined by a first side 200, a second side 205, a third side 210, and a fourth side 215. In embodiments, the first side 200 may be any suitable size, height, shape, and combinations thereof. In these embodiments, the first side 200 may generally be in the shape of a rectangle. As illustrated, the second side 205 may be parallel to the first side 200. In one or more embodiments, the second side 205 may comprise similar or equivalent dimensions as the first side 200. In these embodiments, there may be an opening 220 disposed in the second side 205, wherein the opening 220 may be configured to allow access to an interior of the body 105. As illustrated, the opening 220 may be disposed in both the second side 205 and the third side 210. Without limitations, a portion of the opening 220 disposed in the second side 205 may generally be in the shape of a rectangle with a curvilinear line disposed at an end of the second side 205 closer to the fourth side 215. In embodiments, a remaining portion of the opening 220 disposed in the third side 210 may be in the shape of a rectangle, where the ratio of the dimensions of the rectangle may be similar to those of the shape of the third side 210.

In embodiments, the second side 205 may be coupled to the first side 200 by the third side 210 and the fourth side 215. The third side 210 may be perpendicular to the first side 200 and the second side 205. The third side 210 may be any suitable size, height, shape, and combinations thereof. In these embodiments, the third side 210 may be in the shape of a rectangle. As illustrated, the remaining portion of the opening 220 disposed in the third side 210 may provide for an absence of material comprising the third side 210. In one or more embodiments, the third side 210 may comprise of the thicknesses of the first side 200, a top side 225 of the body 105, and a bottom side 230 of the body 105.

In one or more embodiments, the fourth side 215 may be coupled to the first side 200 and the second side 205 and may be disposed opposite to the third side 210. The fourth side 215 may be any suitable size, height, shape, and combinations thereof. In embodiments, the fourth side 215 may be a curvilinear shape. Without limitations, the fourth side 215 may be a semicircle.

As illustrated, the body 105 may further comprise a first internal compartment 235 and a second internal compartment 240. The first internal compartment 235 and the second internal compartment 240 may be any suitable size, height, shape, and combinations thereof. The first internal compartment 235 may comprise a first wall 245, a second wall 250, and a compartment opening 255. The first wall 245 may be disposed within the body 105 and extend from the first side 200 to the second side 205. The second wall 250 may be disposed within the body 105 and extend from the fourth side 215 to the third side 210. In embodiments, the first wall 245 may be coupled to the second wall 250 where the first wall 245 is perpendicular to the second wall 250. As illustrated, the compartment opening 255 may be disposed in the second wall 250. In embodiments, the compartment opening 255 may be configured to allow access to a main bore (for example, main bore 305 in FIG. 3) that is disposed through the first internal compartment 235 from the top side 225 of the body 105 to the bottom side 230 of the body 105.

The second internal compartment 240 may comprise a first wall 260 and a second wall 265. The first wall 260 may be disposed within the body 105 and extend from the first side 200 to the second side 205. In embodiments, the first wall 260 may be offset from the first wall 245 by a certain distance closer to the third side 210 and may be parallel to the first wall 245. In further embodiments, the first wall 260 may have a shorter length and/or height than the first wall 245. The second wall 265 may be disposed within the body 105 and extend from the first wall 245 to the third side 210. In embodiments, the first wall 260 may be coupled to the second wall 265, wherein the first wall 260 is perpendicular to the second wall 265. In embodiments, the second wall 265 may be offset from the second wall 250 by a certain distance closer to the first side 200 and may be parallel to the second wall 250. In these embodiments, the second wall 265 may have a shorter length and/or height than the second wall 250. In embodiments, there may be a central bore be defined by the first wall 260, second wall 265, first wall 245, and the top side 225 of the body 105. The central bore may be any suitable size, height, shape, and combinations thereof. In these embodiments, the central bore may be configured to receive a position switch (for example, second position switch 815 in FIG. 8), wherein the position switch may be inserted through an end of the second internal compartment 240 opposite of the top side 225 of the body 105.

Figure 3:
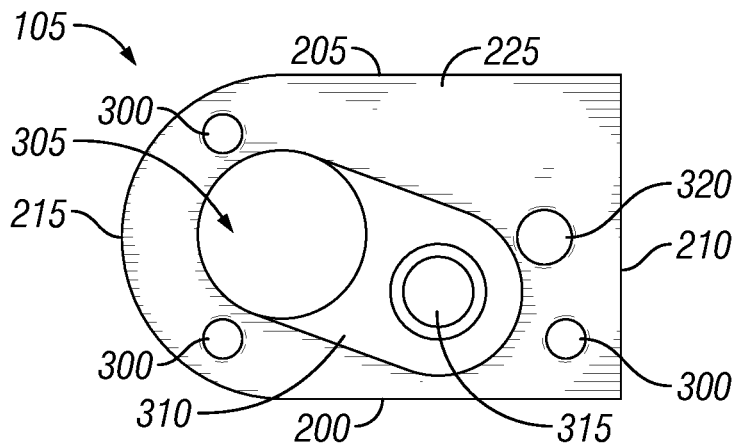
FIG. 3 illustrates an example top view of the body in FIG. 2, according to certain embodiments.

FIG. 3 illustrates a top view of the top side 225 of the body 105. The top side 225 of the body 105 may be any suitable size, height, shape, and combinations thereof. In these embodiments, the top side 225 of the body 105 may be in the shape defined by the first side 200, the second side 205, the third side 210, and the fourth side 215. In one or more embodiments, the top side 225 of the body 105 may comprise one or more fastener holes 300, wherein each of the one or more fastener holes 300 may be configured to receive any suitable fastener. The top side 225 of the body 105 may further comprise a main bore 305, a valve recess 310, a valve fastener hole 315, and a light-emitting diode (LED) hole 320. In embodiments, the main bore 305 may be disposed through the top side 225 of the body 105 about or near the fourth side 215. The main bore 305 may be any suitable size, height, shape, and combinations thereof capable to receive a portion of a valve (for example, valve 400 in FIG. 4). As illustrated, the main bore 305 may be disposed adjacent to the valve recess 310. In embodiments, the valve recess 310 may be configured to receive a remaining portion of the valve (for example, valve 400 in FIG. 4). The valve recess 310 may be any suitable size, height, shape, and combinations thereof. The valve recess 310 may be offset below the top side 225 of the body 105 by a certain distance and may be parallel to the top side 225 of the body 105. In embodiments, the valve fastener hole 315 may be disposed in the valve recess 310. The valve fastener hole 315 may be configured to receive any suitable fastener to couple the valve (for example, valve 400 in FIG. 4) to the top side 225 of the body 105. In one or more embodiments, the LED hole 320 may be disposed about any suitable location on the top side 225 of the body 105. As illustrated, the LED hole 320 may be disposed near the valve recess 310 between the valve recess 310 and the third side 210. In embodiments, the LED hole 320 may be configured to receive an LED (for example, LED 800 in FIG. 8).

Figure 4:
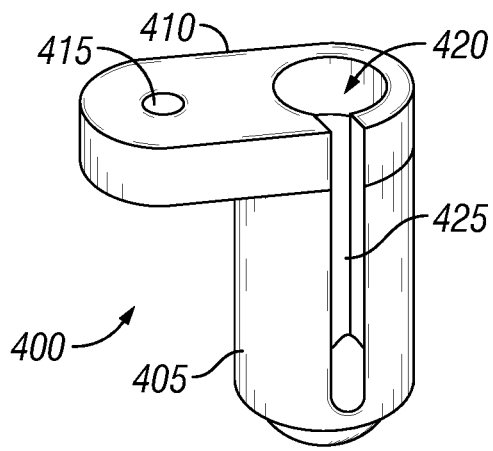
FIG. 4 illustrates an example valve of the eddie-bolt inspection tool in FIG. 1, according to certain embodiments.

FIG. 4 illustrates a view of a valve 400. The valve 400 may be configured to house a position switch (for example, first position switch 810 in FIG. 8). In one or more embodiments, the valve 400 may be at least partially disposed within the body 105 (referring to FIG. 2) to dispose the position switch within the body 105. In embodiments, the valve 400 may be any suitable size, height, shape, and combinations thereof. The valve 400 may comprise any suitable materials. Without limitations, the suitable materials may be metals, nonmetals, polymers, composites, and any combinations thereof. In one or more embodiments, the valve 400 may comprise a valve body 405, a top portion 410, a fastener hole 415, and a central bore 420. The valve body 405 may comprise a circular cross-sectional shape and may generally be cylindrical. In embodiments, the valve bod 405 may be disposed into the main bore 305 (referring to FIG. 3) within the body 105. As illustrated, the top portion 410 may be disposed on top of the valve body 405 and may be coupled to the valve body 405. The top portion 410 may be perpendicular to the valve body. The fastener hole 415 may be disposed in the top portion 410 about any suitable location. In embodiments, the fastener hole 415 may align with valve fastener hole 315 (referring to FIG. 3) to secure the valve 400 to the body 105. In these embodiments, the cross-sectional shape of the top portion 410 may match that of and align with the valve recess 310 (referring to FIG. 3) and the main bore 305. As illustrated, the central bore 420 of the valve 400 may be disposed through the top portion 410 and the valve body 405. In embodiments, the central bore 420 may align with the central axis of the valve body 405. There may be a slot 425 disposed through at least a portion of the length of the valve body 405 configured to provide access to the central bore 420. The slot 425 may be any suitable size, height, shape, and combinations thereof. In embodiments, the slot 425 may at least partially align with the compartment opening 255 (referring to FIG. 2) to provide access from the central bore 420 to the interior of the body 105.

Figure 5A:
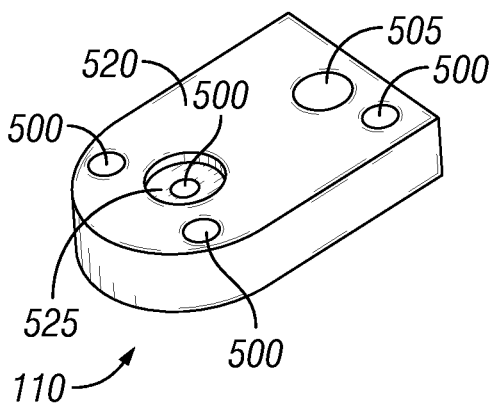
FIG. 5A illustrates an example top view of the cap of the eddie-bolt inspection tool in FIG. 1, according to certain embodiments.
Figure 5B:
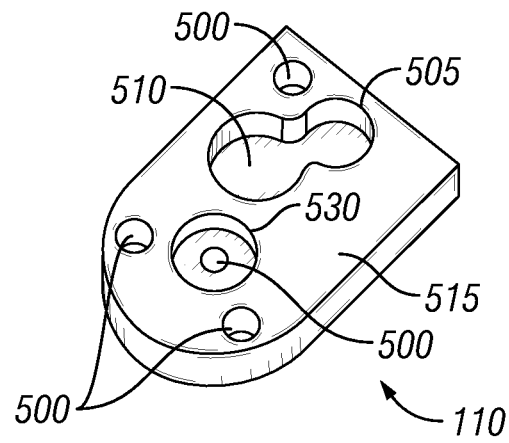
FIG. 5B illustrates an example bottom view of the cap of the eddie-bolt inspection tool in FIG. 1, according to certain embodiments.

FIGS. 5A-5B illustrate a view of the cap 110. FIG. 5A illustrates an isometric top view of the cap 110, and FIG. 5B illustrates an isometric bottom view of the cap 110. With reference to both FIGS. 5A-5B, the cap 110 may be configured to be disposed on top of the body 105 (referring to FIG. 1) and to be coupled to the top side 225 (referring to FIG. 2) of the body 105. As illustrated, the cap 110 may comprise one or more fastener holes 500, a LED hole 505, a fastener recess 510, a shim recess 525, and a spring recess 530. In embodiments, the one or more fastener holes 500 may be disposed through the cap 110 at any suitable location along the cap 110 and may be configured to receive any suitable fastener. In one or more embodiments, the one or more fastener holes 500 of the cap 110 may align with the one or more fastener holes 300 (referring to FIG. 3) of the top side 225 of the body 105 to secure the cap 110 to the body 105. The LED hole 505 may be disposed through the cap 110 at any suitable location along the cap 110 and may be configured to receive the LED (for example, LED 800 in FIG. 8). In one or more embodiments, the LED hole 505 of the cap 110 may align with the LED hole 320 (referring to FIG. 3) of the top side 225 of the body 105. As illustrated, the fastener recess 510 may be disposed in a bottom surface 515 of the cap 110. The fastener recess 510 may be any suitable size, height, shape, and combinations thereof. The fastener recess 510 may be offset from the bottom surface 515 of the cap 110 by a certain distance and may be parallel to the bottom surface 515 of the cap 110. In embodiments, the height of the fastener recess 510 may be less than the thickness of the cap 110 so as to not be accessible from a top surface 520 of the cap 110. The fastener recess 510 may be configured to receive a portion of a suitable fastener protruding from the valve fastener hole 315 (referring to FIG. 3) when the cap 110 is coupled to the body 105. As illustrated, the shim recess 525 may be disposed in the top surface 520 of the cap 110, and the spring recess 530 may be disposed in the bottom surface 515 of the cap. In embodiments, the shim recess 525 may be configured to receive one or more shims (not shown). In embodiments, the spring recess 530 may be configured to receive an end of a spring (not shown) disposed over a position switch (for example, first position switch 815 in FIG. 8) disposed in the valve body 405 (referring to FIG. 4). In embodiments, the cap 110 may be coupled to the body 105 by disposing the bottom surface 515 of the cap 110 against the top side 225 of the body 105 and inserting and securing suitable fasteners into the one or more fastener holes 500 and the one or more fastener holes 300.

Figure 6:
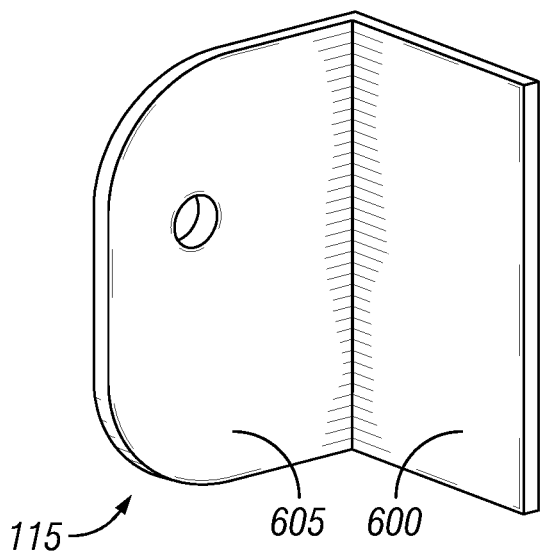
FIG. 6 illustrates an example cover of the eddie-bolt inspection tool in FIG. 1, according to certain embodiments.

FIG. 6 illustrates a view of the cover 115. The cover 115 may be configured to align and/or match the shape of the opening 220 (referring to FIG. 2) of the body 105 (referring to FIG. 2). In embodiments, the cover 115 may be disposed on the body 105 in the opening 220 to seal the interior of the body 105 from an exterior. In embodiments, the cover 115 may be any suitable size, height, shape, and combinations thereof. The cover 115 may comprise any suitable materials. Without limitations, the suitable materials may be metals, nonmetals, polymers, composites, and any combinations thereof. As illustrated a first portion 600 of the cover 115 may be in the shape of a rectangle. In embodiments, the dimensions of the first portion 600 may be similar or equivalent to those of the remaining portion of the opening 220 disposed in the third side 210 (referring to FIG. 2) of the body 105. The first portion 600 of the cover 115 may be coupled to a second portion 605 of the cover 115. As illustrated, the first portion 600 may be perpendicular to the second portion 605. In one or more embodiments, the second portion 605 may generally be in the shape of a rectangle with a curvilinear line disposed at a distal end of the second portion 605 from where the second portion 605 is coupled to the first portion 600. In these embodiments, the dimensions of the second portion 605 may be similar or equivalent to those of the portion of the opening 220 disposed in the second side 205 (referring to FIG. 2) of the body 105. In embodiments, the cover 115 may be coupled to the body 105 through any suitable means, including, but not limited to the use of suitable fasteners.

Figure 7A:
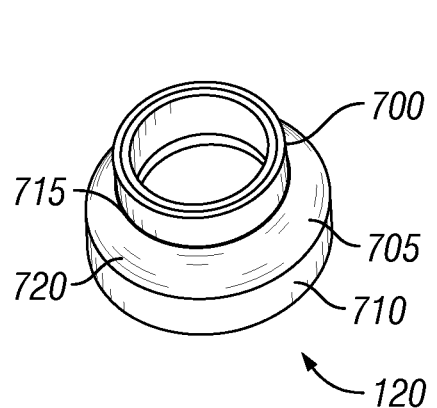
FIG. 7A illustrates an example top view of the nose piece of the eddie-bolt inspection tool in FIG. 1, according to certain embodiments.
Figure 7B:
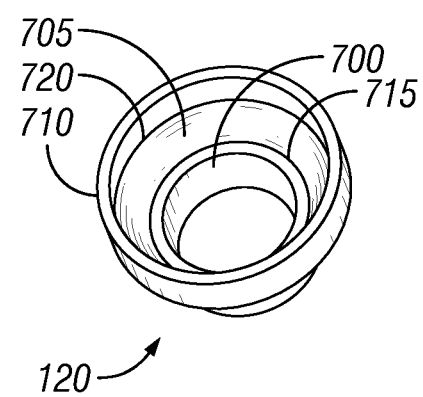
FIG. 7B illustrates an example bottom view of the nose piece of the eddie-bolt inspection tool in FIG. 1, according to certain embodiments.

FIGS. 7A-7B illustrate a view of the nose piece 120. FIG. 7A illustrates an isometric top view of the nose piece 120, and FIG. 7B illustrates an isometric bottom view of the nose piece 120. With reference to both FIGS. 7A-7B, the nose piece 120 may be configured to be disposed below and coupled to the body 105 (referring to FIG. 1). As illustrated, the nose piece 120 may comprise a first cylindrical portion 700, a transitional ring 705, and a second cylindrical portion 710. The first cylindrical portion 700 may be any suitable size, height, shape, and combinations thereof. As illustrated, the first cylindrical portion 700 may have a circular cross-section. In one or more embodiments, the first cylindrical portion 700 may have a uniform or constant diameter with respect to the height of the first cylindrical portion 700. The first cylindrical portion 700 may be disposed at a first end 715 of the transitional ring 705, and the second cylindrical portion 710 may be disposed at a second end 720 of the transitional ring 705 opposite to the first cylindrical portion 700.

In embodiments, the transitional ring 705 may have a circular cross-sectional shape. In one or more embodiments, the diameter of the transitional ring 705 may vary between the first end 715 and the second end 720. In these embodiments, the diameter of the transitional ring 705 may increase from the first end 715 to the second end 720. The second cylindrical portion 710 may be any suitable size, height, shape, and combinations thereof. As illustrated, the second cylindrical portion 710 may have a circular cross-section. In one or more embodiments, the second cylindrical portion 710 may have a uniform or constant diameter with respect to the height of the second cylindrical portion 710. In embodiments, the diameter of the second cylindrical portion 710 may be greater than the diameter of the first cylindrical portion 700. In embodiments, the first cylindrical portion 700 and the transitional ring 705 may be inserted into the bottom side 230 (referring to FIG. 2) of the body 105. As the first cylindrical portion 700 and the transitional ring 705 are inserted, the second cylindrical portion 710 may abut the bottom side 230. Without limitations, the nose piece 120 may be secured or coupled to the body through any suitable means, including, but not limited to, an adhesive.

Figure 8:
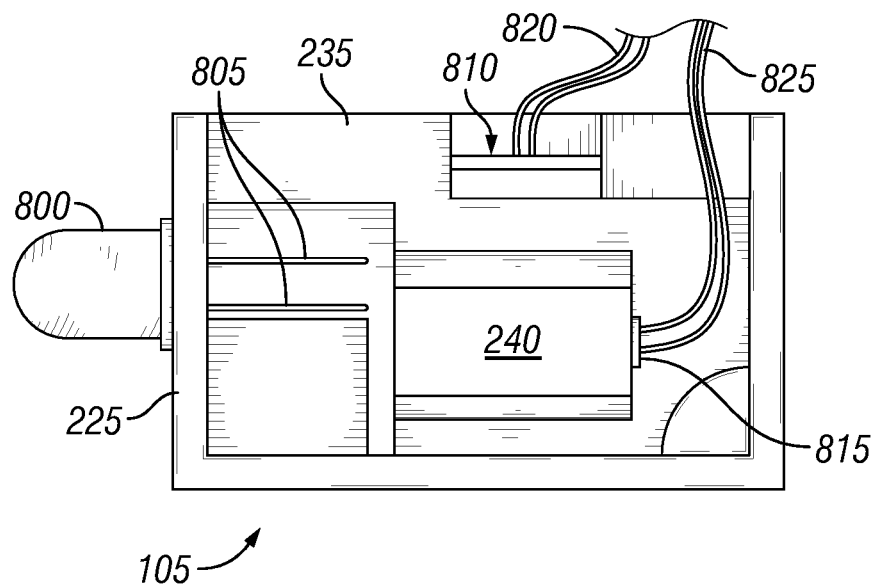
FIG. 8 illustrates an example body of the eddie-bolt inspection tool in FIG. 1, according to certain embodiments.

FIG. 8 illustrates a side view of the interior of the body 105. As illustrated, a LED 800 may be disposed at least partially through the top side 225 of the body 105. The LED 800 may be configured to emit a light when current flows through it. In one or more embodiments, the LED 800 may comprise leads 805, wherein the leads 805 may be inserted through the LED hole 320 (referring to FIG. 3) of the top side 225 into the interior of the body 105. In one or more embodiments, the eddie-bolt inspection tool 100 (referring to FIG. 1) may further comprise a first position switch 810 and a second position switch 815 disposed within the body 105. In embodiments, both the first position switch 810 and the second position switch 815 may be configured to open and close to complete or break an electrical circuit. As illustrated, the first position switch 810 may be disposed in the central bore 420 (referring to FIG. 4) of the valve body 405 (referring to FIG. 4) of the valve 400 (referring to FIG. 4), wherein the valve body 405 is disposed within the main bore 305 (referring to FIG. 3) of the first internal compartment 235. In one or more embodiments, the spring (not shown) may be disposed over and around the first position switch 815 within the valve body 405. In embodiments, the first position switch 810 may comprise switch leads 820, wherein the switch leads 820 may be accessible through the compartment opening 255 (referring to FIG. 2) and the slot 425 (referring to FIG. 4). As illustrated, the second position switch 815 may be disposed in the second internal compartment 240. In embodiments, the second position switch 815 may comprise switch leads 825, wherein the switch leads 825 may be accessible through a central bore formed in the second internal compartment 240.

Figure 9:
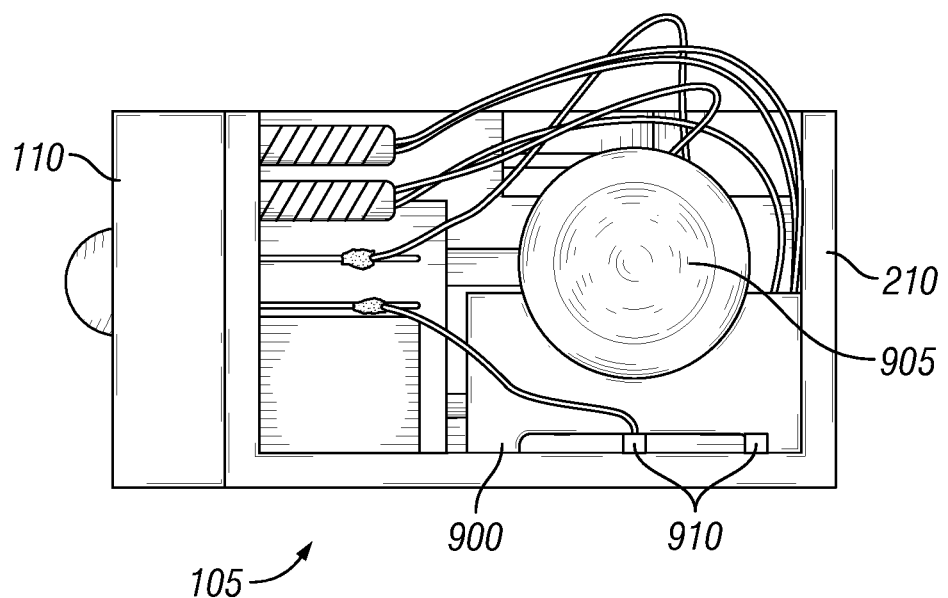
FIG. 9 illustrates an example body of the eddie-bolt inspection tool in FIG. 1, according to certain embodiments.

FIG. 9 illustrates another side view of the interior of the body 105 with the cap 110 coupled to the body 105. As illustrated, the eddie-bolt inspection tool 100 (referring to FIG. 1) may further comprise a battery holder 900 and a battery 905. In embodiments, the battery holder 900 may be any suitable size, height, shape, and combinations thereof capable of housing the battery 905. As illustrated, the battery holder 900 may be disposed onto the interior of the first side 200 abutting the interior of the third side 210 and the first wall 260 (referring to FIG. 2) of the second internal compartment 240 (referring to FIG. 2). The battery holder 900 may comprise terminals 910, wherein the terminals 910 may be configured to couple to other components of an electrical circuit. In one or more embodiments, the battery 905 may be disposed on top of and partially into the battery holder 900. The battery 905 may be any suitable power supply configured to provide power to the eddie-bolt inspection tool 100.

With reference to both FIGS. 8-9, in one or more embodiments, one of the switch leads 820 of the first position switch 810 may be coupled to one of the switch leads 825 of the second position switch 815. In one or more embodiments, another one of the switch leads 820 of the first position switch 810 may be coupled to one of the leads 805 of the LED 800. In one or more embodiments, another one of the switch leads 825 of the second position switch 815 may be coupled to one of the terminals 910 of the battery holder 900. In one or more embodiments, another one of the leads 805 of the LED 800 may be coupled to another one of the terminals 910 of the battery holder 900. Without limitations, the coupling may occur through any suitable means including, but not limited to, soldering.

With reference to FIGS. 1-9, during operations, an operator may calibrate the eddie-bolt inspection tool 100 prior to measuring the height and swage of one or more eddie-bolts. In one or more embodiments, the eddie-bolt inspection tool 100 may be disposed onto a depth micrometer (not shown), wherein the depth micrometer may be partially inserted into the body 105 until the LED 800 emits a light, thereby designating an initial minimum value. Without limitations, the designated minimum value may be any suitable number ranging from about 0.05 to about 0.8. In one or more embodiments, the designated minimum value may be a suitable number from about 0.275 to about 0.435. If the initial minimum value is less than a designated minimum value, the operator may remove the cap 110 and dispose one or more shims (not shown) about each of the one or more fastener holes 300 to increase the minimum value. In these embodiments, the operator may recouple the cap 110 to the body 105 and use the depth micrometer to verify that the one or more shims adjusted the minimum value to be equivalent to the designated minimum value.

In embodiments, the operator may further insert the depth micrometer to determine an initial maximum value. The initial maximum value may be determined when the LED 800 stops emitting the light. If the initial maximum value is less than a designated maximum value, the operator may remove the fastener disposed in the shim recess 525 and dispose one or more shims (not shown) about the one of the one or more fastener holes 300 in the shim recess 525 to increase the maximum value. In these embodiments, the operator may recouple the fastener to the cap 110 and use the depth micrometer to verify that the one or more shims adjusted the maximum value to be equivalent to the designated maximum value. Without limitations, the designated maximum value may be any suitable number ranging from about 0.1 to about 0.8. In one or more embodiments, the designated maximum value may be a suitable number from about 0.358 to about 0.518. In embodiments, the designated minimum and maximum values of swage for an eddie-bolt may be the diameter of the first cylindrical portion 700 of the nose piece 120.

Once calibrated, the eddie-bolt inspection tool 100 may be utilized to visually indicate that one or more eddie-bolts have a height and swage within an allowable tolerance (for example, within the designated minimum and maximum values). In embodiments, the eddie-bolt inspection tool 100 may be disposed over the top of an eddie-bolt, wherein the top of the eddie-bolt may be partially inserted into the nose piece 120. If the top of the eddie-bolt is not flush with the internal diameter of the second cylindrical portion 710 of the nose piece 120, the LED 800 may not emit a light, thereby signaling that the eddie-bolt has not been properly swaged. In embodiments, the bottom side 230 of the body 105 may not be seated flush with an external surface around the eddie-bolt if the eddie-bolt is not properly swaged. In those embodiments, valve 400 may not engage with the top of the eddie-bolt. In one or more embodiments, a downward force may be applied to the eddie-bolt inspection tool to cause the top of the eddie-bolt to push against the valve 400. In these embodiments, the valve 400 may translate vertically and compress the spring disposed around the first position switch 810. In embodiments, the electrical circuit comprising the battery 905, the LED 800, the first position switch 810, and the second position switch 815 may initially be open, wherein the LED 800 is not provided with current to actuate and emit a light. The second position switch 815 may initially be set to closed, and the first position switch 810 may initially be set to open. During operations, as the valve 400 translates, the electrical circuit may close as the top of the eddie-bolt actuates the first position switch 810 to close, thereby providing current to the LED 800, where the LED 800 may emit a light. If the valve 400 translates past the designated maximum value, the electrical circuit may open and stop current from flowing to the LED 800. In embodiments, as the valve 400 translates past the designated maximum value, the second position switch 815 may be actuated to open to stop the emission of light from the LED 800.

The present disclosure may provide numerous advantages, such as the various technical advantages that have been described with respect to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An eddie-bolt inspection tool, comprising:
   a body;
   a valve;
   a light-emitting diode (LED);
   a battery;
   a first position switch;
   a second position switch;
   a cap;
   a nose piece; and
   a cover;
   wherein the cap is disposed on top of the body, wherein the body is disposed on top of the nose piece, where the nose piece is at least partially disposed within the body, wherein the cover is disposed around and on at least a portion of the body, wherein the body comprises:
      a first side;
      a second side;
      a third side;
      a fourth side; and
      an opening.

2. The eddie-bolt inspection tool of claim 1, wherein the first side is coupled to the second side by the third side and the fourth side, wherein the first side is parallel to the second side, wherein the fourth side is curvilinear, wherein a portion of the opening is disposed in the second side and a remaining portion of the opening is disposed in the third side.

3. The eddie-bolt inspection tool of claim 1, wherein the body further comprises:
   a top side;
   a bottom side;
   a first internal compartment; and
   a second internal compartment.

4. The eddie-bolt inspection tool of claim 3, wherein the first internal compartment comprises a first wall, a second wall, and a compartment opening.

5. The eddie-bolt inspection tool of claim 4, wherein the second internal compartment comprises a first wall and a second wall, wherein a central bore of the second internal compartment is defined by the first wall, the second wall, the first wall of the first internal compartment, and the top side.

6. The eddie-bolt inspection tool of claim 5, wherein the second position switch is disposed in the central bore of the second internal compartment.

7. The eddie-bolt inspection tool of claim 3, wherein the top side of the body comprises:
   one or more fastener holes;
   a main bore;
   a valve recess;
   a valve fastener hole; and
   a LED hole;
   wherein the valve recess is disposed adjacent to the main bore, wherein the valve fastener hole is disposed in the valve recess, wherein the LED hole is disposed between the valve recess and the third side of the body.

8. The eddie-bolt inspection tool of claim 7, wherein the cap comprises:
   one or more fastener holes;
   a LED hole;
   a fastener recess;
   a shim recess; and
   a spring recess;
   wherein the shim recess is disposed in a top surface of the cap, wherein the shim recess is configured to receive one or more shims, wherein the fastener recess and the spring recess are disposed in a bottom surface of the cap.

9. The eddie-bolt inspection tool of claim 3, wherein the LED is disposed at least partially through the cap and the top side of the body, wherein the cap is coupled to the top side of the body.

10. The eddie-bolt inspection tool of claim 3, further comprising a battery holder, wherein the battery is disposed within the battery holder, wherein the battery holder is disposed onto the interior of the first side of the body abutting the interior of the third side of the body and a first wall of the second internal compartment.

11. The eddie-bolt inspection tool of claim 10, wherein the battery holder comprises terminals, wherein the LED comprises leads, wherein both the first position switch and the second position switch comprise switch leads.

12. The eddie-bolt inspection tool of claim 11, wherein one of the switch leads of the first position switch is coupled to one of the switch leads of the second position switch.

13. The eddie-bolt inspection tool of claim 11, wherein another one of the switch leads of the first position switch is coupled to one of the leads of the LED.

14. The eddie-bolt inspection tool of claim 11, wherein another one of the switch leads of the second position switch is coupled to one of the terminals of the battery holder.

15. The eddie-bolt inspection tool of claim 11, wherein another one of the leads of the LED is coupled to another one of the terminals of the battery holder.

16. The eddie-bolt inspection tool of claim 1, wherein the valve comprises:
   a valve body;
   a top portion;
   a fastener hole;
   a central bore; and
   a slot;
   wherein the valve body is cylindrical, wherein the top portion is disposed on top of and perpendicular to the valve body, wherein the fastener hole is disposed in the top portion, wherein the central bore is aligned with a central axis of the valve body, wherein the slot is disposed through at least a portion of the length of the valve body.

17. The eddie-bolt inspection tool of claim 16, wherein the first position switch is disposed in the valve body.

18. The eddie-bolt inspection tool of claim 17, wherein a spring is disposed around the first position switch in the valve body.

19. The eddie-bolt inspection tool of claim 1, wherein the nose piece comprises a first cylindrical portion, a transitional ring, and a second cylindrical portion.

20. The eddie-bolt inspection tool of claim 19, wherein the first cylindrical portion is disposed at a first end of the transitional ring, wherein the second cylindrical portion is disposed at a second end of the transitional ring, wherein the diameter of the transitional ring increases from the first end to the second end, wherein the diameter of the second cylindrical portion is greater than the diameter of the first cylindrical portion.

* * * * *